Figure 1:
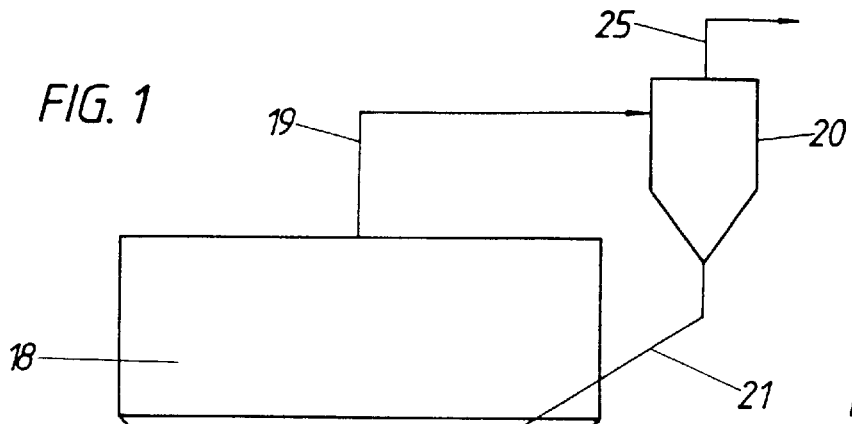

United States Patent [19]

Kepplinger et al.

[11] Patent Number: 6,030,432
[45] Date of Patent: Feb. 29, 2000

[54] PROCESS FOR REDUCING ORE FINES AND ARRANGEMENT FOR CARRYING OUT THE PROCESS

[75] Inventors: Werner Leopold Kepplinger, Leonding; Felix Wallner; Johannes-Leopold Schnek, both of Linz; Udo Gennari, Linz, all of Austria; Il-Ock Lee, Pohang, Rep. of Korea; Yong-Ha Kim, Pohang, Rep. of Korea; Gyu-Dae Park, Pohang, Rep. of Korea

[73] Assignees: Voest-Alpine Industrieanlagenbau GmbH, Linz, Austria; Pohang Iron & Steel Co., Ltd., Rep. of Korea; Research Institute of Industrial Science & Technology Incorporated Foundation, Rep. of Korea

[21] Appl. No.: 08/913,505

[22] PCT Filed: Mar. 11, 1996

[86] PCT No.: PCT/AT96/00045

§ 371 Date: Nov. 17, 1997

§ 102(e) Date: Nov. 17, 1997

[87] PCT Pub. No.: WO96/29435

PCT Pub. Date: Sep. 26, 1996

[30] Foreign Application Priority Data

Mar. 17, 1995 [AT] Austria ...................................... 477/95

[51] Int. Cl.[7] .............................. C21B 11/00; C22B 1/10
[52] U.S. Cl. .............................. 75/451; 75/414; 266/144; 266/157; 266/172
[58] Field of Search .............................. 75/10.44, 10.43, 75/10.45, 310, 436, 443, 444, 446, 447, 450, 961, 451, 414; 266/144, 172, 157

[56] References Cited

U.S. PATENT DOCUMENTS 2,733,137  1/1956  Swaine et al. .
2,789,034  4/1957  Swaine et al. .
4,975,116  12/1990  Basen et al. ........................ 75/414
5,092,564  3/1992  Basen et al. ........................ 266/172
5,762,681  6/1998  Lee et al. ........................ 75/446

FOREIGN PATENT DOCUMENTS 390622    6/1990   Australia .
0630975   12/1994  European Pat. Off. .
1069849   7/1954   France .
91/19779  11/1991  Rep. of Korea .
92/24265  12/1992  Rep. of Korea .
92/24266  12/1992  Rep. of Korea .
92/27502  12/1992  Rep. of Korea .
1365100   8/1974   United Kingdom .

OTHER PUBLICATIONS

*Database WPI*, Derwent Publications Ltd., London, GB, AN 96–185192 c19, "Fluidized Bed Furnace for Reduction of Ore", (JP–A–8060215, Mar. 5, 1996).

(List continued on next page.)

*Primary Examiner*—Prince Willis
*Assistant Examiner*—Tima McGuthry-Banks
*Attorney, Agent, or Firm*—Ostrolenk, Faber, Gerb & Soffen, LLP

[57] ABSTRACT

In a process for the reduction of fine ore by reducing gas in the fluidized bed method, the following characteristic features are realized in order to achieve a uniform and even degree of metallization at optimum utilization of the reducing gas and while minimizing the amount of reducing gas employed, that the fine ore is fractionated by aid of the reducing gas into at least two fractions having different grain size distributions, that each fraction is reduced by the reducing gas in a separate fluidized bed, wherein the reducing gas maintains a first fluidized bed containing the coarse-grain fraction and separates the fine-grain fraction from the same, is accelerated together with the fine-grain fraction, subsequently under pressure release forms a further fluidized bed, into which it is continuously injected in a radially symmetrical manner and from below, and wherein, furthermore, secondary reducing gas additionally is directly injected into the further fluidized bed in a radially symmetrical manner, and that reduced ore is discharged from both the first and the second fluidized beds.

13 Claims, 1 Drawing Sheet

OTHER PUBLICATIONS

*Patent Abstracts of Japan*, vol. 12, No. 213 (C–505), Jun. 17, 1988 (JP–A–63011611, Jan. 19, 1988).

*Patent Abstracts of Japan*, vol. 13, No. 472 (C–647), Oct. 15, 1989, (JP–A–1184211, Jul. 21, 1989).

*Patent Abstracts of Japan*, vol. 12, No. 213 (C–505), Jun. 17, 1988, (JP–A–63011609, Jan. 19, 1988).

*Patent Abstracts of Japan,* vol. 18, No. 215 (C–1191), Apr. 18, 1994, (JP–A–6010021, Jan. 18, 1994).

*Patent Abstracts of Japan,* vol. 12, No. 398 (C–538), Oct. 21, 1988, (JP–A–63140020, Jun. 11, 1988).

*Patent Abstracts of Japan,* vol. 13, No. 414 (C–635), Sep. 13, 1989, (JP–A–1152211, Jun. 14, 1989).

*Patent Abstracts of Japan,* vol. 12, No. 398 (C–538), Oct. 21, 1988, (63–140020, Jun. 11, 1988).

Patent Abstracts of Japan, vol. 12, No. 398 (C–538), Oct. 21, 1988, (63–140021, Jun. 11, 1988).

Patent Abstracts of Japan, vol. 12, No. 398 (C–538), Oct. 21, 1988, (63–140022, Jun. 11, 1988).

*Patent Abstracts of Japan,*vol. 13, No. 379 (C–628), Aug. 22, 1989, (JP–A–1129915, May 23, 1989).

PROCESS FOR REDUCING ORE FINES AND ARRANGEMENT FOR CARRYING OUT THE PROCESS

The invention relates to a process for the reduction of fine ore by reducing gas in the fluidized bed method and an arrangement for carrying out the process.

In the reduction of ores it is often necessary to employ fine ores having a wide range of grain sizes, for example grain sizes ranging from dust particle size up to 8 mm. Here, difficulties occur due to the superfines, as these are often discharged along with the spent, respectively partially spent reducing gas and, to avoid losses, have then to be separated from the same and recycled to the reduction process.

To overcome these difficulties it is known to separate the fine ore by means of the reducing gas by gas classification into two fractions having different grain size distributions each and to substantially completely reduce these two fractions separately (AT-B-390622). It is of advantage, as already disclosed in JP-A-6-10021, if both fluidized beds are maintained directly above each other, which results in short gas and material flows. According to JP-A-6-10021, in a first reactor vessel, in which a first fluidized bed has been formed, entrainment of the fine particles of the charged ore by the reducing gas occurs. The reducing gas emerging from the first reactor vessel is introduced into a second reactor vessel arranged directly on top of the first reactor vessel and, there, pressure is released under formation of a further fluidized bed, by this second reactor vessel being provided with a larger cross section than the first reactor vessel. From each of the two fluidized beds completely, respectively substantially completely reduced ore is discharged directly. Supply of ore and of reducing gas is only effected into the first lower reactor vessel.

One disadvantage involved here is that optimum reduction can only be adjusted for one of the fluidized beds each by supplying a specific amount of reducing gas having a specific chemical composition. The reduction resulting for the further upper fluidized bed will be a function of the reduction of the ore and thus of the change in the chemical composition of the reducing gas in the lower fluidized bed. In addition, optimum separation of the ore into fractions containing different grain size distributions each is difficult to accomplish here, as the amount of reducing gas that is introduced has to be adjusted predominantly as a function of the coarse-grain fraction provided in the lower reduction vessel and the degree of metallization desired for the same, which, in turn, results in a very specific quantitative discharge of fine-grain fraction, wherein it is impossible to influence or optimize the reduction of the fine-grain fraction as such.

In this connection, a further difficulty results, namely that backflowing of the fine-grain fraction separated from the reducing gas may occur, as the gas velocity at the walls of the upper and lower reactor vessel vanishes toward zero and, there, a downward movement of ore particles, i.e. toward the fluidized bed containing coarser ore particles, takes place.

To avoid the latter disadvantage it is known from U.S. Pat. No. 4,975,116 to provide a narrow between two reactor vessels disposed one above the other, where the reducing gas is accelerated. Thereby it becomes feasible to prevent backmixing of the ore particles present in the superposed fluidized beds. However, according to U.S. Pat. No. 4,975,116 the entire ore passes through both reactor vessels, as discharge of solids and gas is only provided for at the upper end of the upper reactor vessel. Hence, gas classification of the ore into fractions having different grain size distributions is not provided for. This constitutes a disadvantage in that, as a consequence, different retention times result for ore having different grain sizes and, accordingly, different degrees of metallization ensue. This process is therefore not suited for ore having a wide grain size range.

From KR-Patent applications 92-24265, 91-19779, 92-27502 and 92-24266 it is known to separate ore by gas classification by aid of the reducing gas into two or several fractions having different grain size distributions each and to reduce each of these fractions by a fresh supply of reducing gas in separate fluidized beds forming due to the newly introduced reducing gas, and to discharge reduced ore from each of the fluidized beds. Here, passing on of the reducing gas from one fluidized bed to the next is effected in such a way that the reducing gas along with the fine ore particles entrained by the reducing gas enters the next reactor vessel laterally, thereby causing disturbances in the formation of the fluidized beds.

Thereby it further becomes impossible to integrate the reducing gas conveyed onwards and still possessing a certain reduction potential into the reduction process taking place in the subsequently arranged fluidized bed-: on the contrary, the subsequently arranged fluidized bed is formed solely by freshly and directly supplied reducing gas, so that with this known process there results a very high level of reducing gas consumption and, hence, high costs ensue. Further, reducing gas incurs in considerable amounts, still possessing a considerable reduction potential, which either has to be written off as a loss or has to be employed elsewhere.

The invention aims at avoiding these disadvantages and difficulties and has as its object to provide a process of the initially described kind and an arrangement for carrying out the process that enable a uniform and even degree of metallization even while employing an ore having a wider range of grain sizes. In particular, optimum utilization of the reducing gas is to be achieved here, wherein it is to be feasible to minimize the amount of reducing gas employed.

In accordance with the invention this object is achieved by the combination of the following characteristic features:

that the fine ore is fractionated by aid of the reducing gas into at least two fractions having different grain size distributions, i.e., into at least one coarse-grain fraction and at least one fine-grain fraction, that each fraction is reduced by the reducing gas in a separate fluidized bed wherein the reducing gas maintains a first fluidized bed containing the coarse-grain fraction and separates the fine-grain fraction from the same, is accelerated together with the fine-grain fraction, subsequently under pressure release forms a further fluidized bed, into which is continuously injected in a radially symmetrical manner and from below, and wherein, furthermore, secondary reducing gas additionally is directly injected into the further fluidized bed in a radially symmetrical manner in an amount and/or chemical composition to ensure the reduction of the fine-grain fraction in this fluidized bed to a predetermined degree of metallization within a predetermined period of time, and that reduced ore is discharged from both the first and the second fluidized beds.

To minimize the amount of reducing gas required for reduction, advantageously the grain size distribution of the separated fine-grain fraction is adjusted as a function of the overall grain size distribution by adjusting the amount of reducing gas fed into the first fluidized bed per time unit and, at the same time, the degree of reduction of the fine-grain fraction is adjusted by adjusting the amount of secondary reducing gas additionally fed to this fraction directly.

An arrangement for carrying out the process is characterized by the following characteristic features:

- a first reactor vessel for receiving a first fluidized bed, which comprises a fine-ore supply duct, a radially symmetrically arranged reducing-gas feed duct, a discharge means for reduced ore and a gas discharge means carrying off spent or partially spent reducing gas,
- at least one further reactor vessel for receiving a further fluidized bed, which comprises at least one supply opening for fine ore and reducing gas arranged radially symmetrical in the bottom region of this reactor vessel, a duct carrying off spent reducing gas and a discharge duct for ore reduced in this further fluidized bed, wherein
- a nozzle-like contraction effecting an acceleration of the reducing gas is provided between the gas discharge means of the first reactor vessel and the supply opening for fine ore and reducing gas of the second reactor vessel, and
- the further reactor vessel is equipped with a radially symmetrically arranged secondary-reducing gas feed means, such as a gas distribution bottom, which is provided in the bottom region of the fluidized bed formed in this reactor vessel.

According to a preferred embodiment, the further reactor vessel is arranged directly above the first reactor vessel and has a cross section that is widened relative to the first reactor vessel. This results in a plant that is constructionally simple as well as space-saving and in which short gas and material flows are ensured.

Another preferred embodiment is characterized in that the further reactor vessel extends beyond the cross section of the first reactor vessel by a circularly ring-shaped enlargement directed radially outwards, and that a gas distribution bottom for feeding the secondary reducing gas is provided in this enlargement.

To optimize the level of gas consumption and the degree of metallization, suitably the gas feed duct to the first reactor vessel and the secondary-reducing-gas feed means to the further reactor vessel are provided with volume controlling valves.

To minimize discharge of fine ore particles from the fluidized bed containing the fine-grain fraction, suitably the further reactor vessel, in its upper region, is provided with a radially outwardly cantilevering expansion increasing the cross sectional area and forming a gas calm-down space.

To convey back bigger fine ore particles or ore agglomerates respectively, the gas discharge means suitably departs from the first reactor vessel by at least one vertically oriented region and advantageously the further reactor vessel has an oblique bottom tapering off towards the supply opening for fine ore and reducing gas.

Suitably, a dust separating means, preferably a cyclone, is installed in the duct carrying off reducing gas and the plant is provided with a dust recycling duct.

An embodiment which can be easily realized is characterized in that the further reactor vessel is designed to be cylindrical.

To minimize the amount of dust being discharged, advantageously the further reactor vessel is designed to be widened conically upwards.

Figure 2:
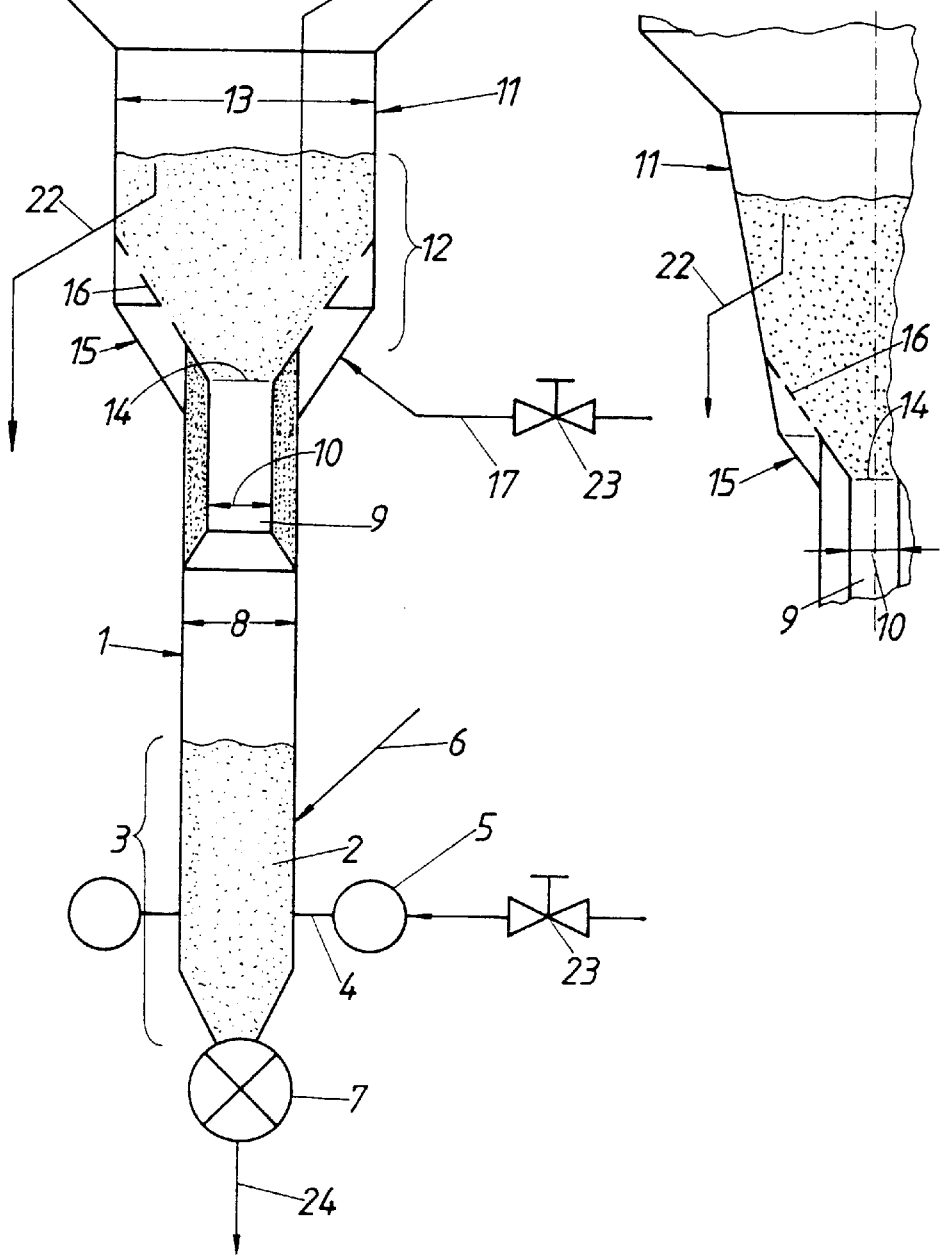

In the following, the invention is explained in more detail with reference to the exemplary embodiments represented in the drawings, each of FIGS. 1 and 2 showing an axial section of an arrangement according to the invention in schematic representation according to one embodiment each.

An arrangement for carrying out the process according to the invention has a first reactor vessel 1 for receiving a first fluidized bed 3 formed of ore 2. The reducing gas maintaining the fluidized bed 3 is fed in radially symmetrically via a reducing-gas feed duct 4 departing from a annular duct 5 surrounding the reactor vessel 1. The supply of fine ore is effected through a fine-ore supply duct 6 that runs into the reactor vessel 1 from the side.

At the lower end of the frustoconically narrowing reactor vessel 1 a discharge means 7 for reduced ore is provided. At the upper end of the first reactor vessel 1 suitably exhibiting a circular cross section 8, at a distance above the fluidized bed 3 a roughly vertically oriented gas discharge means 9 is provided that has a preferably also circular cross section 10 that is decreased as compared to the reactor cross section 8. The gas discharge means 9 thus forms a nozzle-like contraction. The vertical disposition of the gas discharge means 9 enables recycling of bigger ore particles accidentally entrained by the reducing gas streaming upward or of agglomerates forming during reduct ion into the fluidized bed 3.

Directly above the first reactor vessel 1 a further reactor vessel 11 is provided for accommodating a further fluidized bed 12. Into this further reactor vessel 11, which has a circular cross section 13 that is larger than the cross section 8 of the first reactor vessel 1, the gas discharge means 9 of the first reactor vessel 1 enters via a radially symmetrically arranged, i.e. here centrally disposed, gas supply opening 14, through which the reducing gas which emerges from the first reactor vessel 1 and entrains part of the fine ore, namely the part having a grain size lying in the lower range of the grain size distribution, enters the fluidized bed 12 and maintains the same. The lower end of the second reactor vessel 1 is like wise constructed to be frustoconical in shape, with the further reactor vessel 11 cantilevering radially outward relative to the first reactor vessel 1 in the shape of a circular ring, i.e. being provided with an outwardly extending circularly ring-shaped enlargement 15.

At this enlargement 15, the further reactor vessel 11 is provided with a radially symmetrically arranged gas (distribution bottom 16 for directly feeding a secondary reducing gas streaming in via a gas feed duct 17, which additionally, along with the reducing gas streaming in from the first reactor vessel 1 not only serves for maintaining the fluidized bed 12 in the further reactor vessel 11, but also for sufficiently reducing the fine ore 2 present in this fluidized bed 12. On this occasion, the residual reduction potential of the reducing gas streaming out of the first reactor vessel 1 is utilized. The gas distribution bottom 16, which may be constructed as a perforated bottom, a sieve bottom, a valve tray or a bubble plate or the like, is designed to taper off (roughly frustoconically) toward the centrally disposed gas supply opening 14, such that bigger ore particles or agglomerates formed by them fall back into the fluidized bed 3 in the first reactor vessel 1.

The further reactor vessel 11 is at its upper end provided with an expansion 18 that is also directed radially outward, i.e. one that is outwardly cantilevering, as a result of which the gas velocity drops markedly at a distance above the fluidized bed 12, f.i. to approximately half the velocity within the fluidized bed 12, which causes a drastic reduction in the amount of dust being discharged along with the spent reducing gas carried out at the top, via the discharge duct 19. The spent reducing gas is purified in a cyclone 20, from which the fine particles thus separated are again passed into the fluidized bed 12 of the further reactor vessel 11 via a recirculating duct 21. The further reactor vessel 11 is provided with a separate discharge means 22 for the fine ore reduced in it.

In accordance with the invention, separation of the charged fine ore 2, which has a wide grain size range (dimensions ranging for example from 0 . . . to 8 mm), is effected in the plant by gas classification by means of the reducing gas into a coarse-grain fraction and into a fine-grain fraction, i.e. into fractions having different grain size distributions. Thereby it is made possible to optimally adjust the flow conditions for fluidization and the ore retention time to the baking of the grains.

Fine particles carried out of the first lower reactor vessel 1, due to the nozzle-like contraction 9 are prevented from streaming back into this reactor vessel 1, since they are entrained upwards again by the reducing gas streaming upward through the contraction 9 at an elevated velocity. The volume controlling devices 23 provided in the reducing-gas feed ducts 5 and 17 render it feasible to ensure an optimum gas flow and hence an optimum retention time of the ore particles in the reducing gas for each of the fractions, i.e. for each of the fluidized beds 3 and 12. It thus becomes possible to precisely adjust a predetermined degree of metallization of the fine ore, both of the fine-grain and of the coarse-grain fraction, at the lowest possible consumption of reducing gas, within a predetermined period of time.

The ore which has been reduced and is carried out of the first reactor vessel 1 by means of the discharge means 7 is conveyed onwards via a solids discharge duct 24. Via the duct 25, which is connected to the cyclone 20, the purified gas is drawn off along with the residual dust contained in this drawn-off gas.

FIG. 2 shows a variant of the further reactor vessel 11 that instead of exhibiting the cylindrical shape illustrated in FIG. 1 is constructed so as to be upwardly flared.

The process according to the invention is disclosed in a more detailed manner with reference to the following exemplary embodiment:

Into the first reactor vessel 1, fine ore 2 is introduced which has a bulk density of 3,900 kg/m$^3$. This fine ore has a grain size distribution as according to the following table.

| Grain size distribution: | −4 mm | 100% |
| --- | --- | --- |
| | −2 mm | 65% |
| | −1 mm | 50% |
| | −0.5 mm | 38% |
| | −0.125 mm | 22% |
| | −0.063 mm | 8% |

This fine ore 2 is charged by means of a fluidizing medium, namely a reducing gas at 800° C. and 4.5 bar abs. Solids are charged ih an amount of 115 kg/h. The discharge of partially reduced ore from the first reactor vessel 1 amounts to 64 kg/h, the discharge of partially reduced ore from the further reactor vessel 11 is 36 kg/h. The loss of dust amounts to 2 kg/h.

The reactor vessel 1 of the arrangement has a diameter of 126 mm and a height of 1.5 m. The vertically superposed further reactor vessel 11 has a diameter of 295 mm and also a height of 1.5 m. The gas velocity clear tube velocity realized in these reactor vessels 1 and 11 is 2.22 m/s in the first reactor vessel 1 and 0.64 m/s in the further reactor vessel 11. The gas velocity in the nozzle-like contraction 9 provided between the two reactor vessels 1 and 11 amounts to 5 m/s.

The grain size distribution at ore discharge is stated in the following table:

| Grain size distribution: discharge - first reactor vessel 1 | |
| --- | --- |
| −4 mm | 100% |
| −2 mm | 60% |
| −1 mm | 40% |
| −0.125 mm | 10% |
| −0.063 mm | 2% |
| Grain size distribution: discharge - further reactor vessel 11 | |
| −1 mm | 100% |
| −0.125 mm | 53% |
| −0.063 mm | 9% |

Reducing gas is supplied to the first reactor vessel 1 in an amount of 87 Nm$^3$/h and to the further reactor vessel 11 in an amount of 50 Nm$^3$/h.

The chemical composition of the reducing gas is stated below:

Fresh gas: 55% CO

15% $CO_2$

20% $H_2$

5% $H_2O$

5% $N_2$

Spent gas: 46.2% CO 23.8% $CO_2$ 15.5% $H_2$ 9.5% $H_2O$

5% $N_2$

The degree of reduction of the fine ore is a uniform 40%.

The following is a description of a further exemplary embodiment:

In the first reactor vessel 1, prereduced fine ore 2 having a bulk density of 3,450 kg/m$^3$ and a degree of reduction of 40% is charged. This fine ore has a grain size distribution as shown in the following table.

| Grain size distribution: | −4 mm | 100% |
| --- | --- | --- |
| | −2 mm | 74.5% |
| | −1 mm | 61.5% |
| | −0.125 mm | 25.5% |
| | −0.063 mm | 4.5% |

Charging of this fine ore 2 is effected by a fluidizing medium, namely a reducing gas at 850° C. and 4.7 bar abs. Solids are charged in an amount of 1 kg/h. The discharge at the first reactor vessel 1 amounts to 52 kg/h, the discharge at the further reactor vessel 11 is 30 kg/h. The loss of dust amounts to 1.2 kg/h.

The first reactor vessel 1 of the arrangement has a diameter of 126 mm and a height of 1.5 m. The vertically superposed further reactor vessel 11 has a diameter of 295 mm and a height of 1.5 m. The gas velocity clear tube velocity realized in these reactor vessels 1 and 11 is 2.22 m/s in the first reactor vessel 1 and 0.64 m/s in the further reactor vessel 11. In the nozzle-like contraction 9 provided between the two reactor vessels 1 and 11 the gas velocity amounts to 5 m/s.

The grain size distribution at ore discharge is shown in the following table:

| Grain size distribution: discharge - first reactor vessel 1 | |
|---|---|
| −4 mm | 100% |
| −2 mm | 85% |
| −1 mm | 67% |
| −0.125 mm | 11% |
| −0.063 mm | 1% |
| Grain size distribution: discharge - further reactor vessel 11 | |
| −1 mm | 100% |
| −0.125 mm | 54% |
| −0.063 mm | 10% |

Reducing gas is supplied to the first reactor vessel 1 in an amount of 87 $Nm^3/h$ and to the further reactor vessel 11 in an amount of 50 $Nm^3/h$.

The chemical composition of the reducing gas is indicated below:

Fresh gas: 65% CO
    4% $CO_2$
    25% $H_2$
    1% $H_2O$
    5% $N_2$

Spent gas: 53.75 CO
    15.3% $CO_2$
    19.3% $H_2$
    6.7% $H_2O$
    5% $N_2$ The degree of reduction of the fine ore is a uniform 93%.

If in conventional reduction processes such as those mentioned in the introductory part of the specification, a change occurs in the grain size distribution of the fine ore 2 being charged, there results a quantitative shift in the respective percentages of the coarse-grain fraction and the fine-grain fraction. In accordance with the invention this can be counteracted in a particularly simple manner. If, for example, the percentage of the coarse-grain fraction in the lower first reactor vessel 1 increases, this necessitates a mandatory increase in the amount of reducing gas being charged, in order to achieve the desired degree of metallization. However, an increase in the amount of reducing gas will result in an acceleration in gas velocity, whereby a quantitatively more important portion of the coarse-grain fraction of the first reactor vessel 1 is entrained by the reducing gas and conveyed to the further reactor vessel 11. This again results in a state of equilibrium.

If the quantitative portion of the coarse-grain fraction drops (for example to less than 50%), it is important to note that the amount of reducing gas being introduced cannot be lowered at will, since, otherwise, the velocity of the reducing gas will drop to an unacceptable level and hence the fluidized bed 3 will collapse. A certain lowering in the percentage of the coarse grain fraction does, however, not entail any disturbances, as the reducing gas which is not fully exploited in the first reactor vessel 1 due to the lower content of coarse-grain fraction will yield its residual reduction potential, i.e. its CO content, to the fine-grain fraction in the further reactor vessel. In this case the secondary reducing gas supplied to this further reactor vessel 11 can then be quantitatively reduced.

The invention is not limited to the exemplary embodiment disclosed in the drawing and specification but may be modified in various respects. For example, it is also feasible to provide more than two reactor vessels containing fluidized beds having different grain size fractions each. In this case, too, reducing gas has to be feel in directly in each of the fluidized beds separately and independent of the other fluidized beds, to achieve an essentially complete reduction of the fine ore fraction contained in the respective fluidized bed in each instance.

We claim:

1. A process for the reduction of fine ore by reducing gas in the fluidized bed method, said process comprising:
    fractionating fine ore (2) by the aid of the reducing gas into at least one coarse-grain fraction and at least one fine-grain fraction;
    reducing each fraction by the reducing gas in a separate fluidized bed (3, 12), wherein the reducing gas
        maintains a first fluidized bed (3) containing the coarse-grain fractions,
        fractionates the fine-grain fraction from the coarse grain fraction by accelerating the reducing gas together with the fine-grain fraction by contraction means (9), and
        subsequently maintains a second fluidized bed (12), into which said reducing gas is continuously injected in a radially symmetrical manners;
    directly injecting a secondary reducing gas into the second fluidized bed (12) in a radially symmetrical manner in an amount and/or chemical composition to ensure reduction of the fine-grain fraction in said second fluidized bed (12); and
    discharging reduced ore from both the first and the second fluidized beds (3, 12).

2. A process according to claim 1, characterized in that the grain size distribution of the separated fine-grain fraction is adjusted as a function of the overall grain size distribution by adjusting the amount of reducing gas fed into the first fluidized bed (3) per time unit and, at the same time, the degree of reduction of the fine-grain fraction is adjusted by adjusting the amount of secondary reducing gas additionally fed to this fraction directly.

3. Apparatus for the reduction of fine ore by reducing gas in the fluidized bed method, said apparatus comprising:
    a first reactor vessel (1) for receiving a first fluidized bed (3), which comprises a fine-ore supply duct (6), a radially symmetrically arranged reducing-gas feed duct (4), a discharge means (7) for reduced ore and a gas discharge means (9) carrying off spent or partially spent reducing gas,
    at least one further reactor vessel (11) for receiving a further fluidized bed (12), which comprises at least one supply opening (14) for fine ore (2) and reducing gas arranged radially symmetrical in the bottom region of this reactor vessel, a duct (19) carrying off spent reducing gas and a discharge duct (22) for ore reduced in said further fluidized bed (12), wherein
        a contraction means (9) effecting an acceleration of the reducing gas is provided between the gas discharge means (9) of the first reactor vessel (1) and the supply opening (14) for fine ore and reducing gas of said further reactor vessel (11),
        the further reactor vessel being equipped with a radially symmetrically arranged secondary reducing gas feed means (16, 17) provided in the bottom region of said further fluidized bed (12).

4. Apparatus according to claim 3, characterized in that the further reactor vessel 1s arranged directly above the first reactor vessel (1) and has a cross section (13) that is widened relative to the first reactor vessel (1).

5. Apparatus according to claim 4, characterized in that the further reactor vessel (11) has an oblique bottom (16) tapering off towards the supply opening (14) for fine ore and reducing gas.

6. Apparatus according to claim 4, characterized in that a dust separating means (20), is installed, and a dust recycling duct (21) is provided, in the duct (19) carrying off reducing gas.

7. Apparatus according to claim 6, wherein said dust separating means is a cyclone.

8. Apparatus according to claim 4, characterized in that the further reactor vessel (11) is cylindrical.

9. Apparatus according to claim 4, characterized in that the further reactor vessel (11) is widened conically upwards.

10. Apparatus according to claim 3, characterized in that the further reactor vessel (11) extends beyond the cross section (8) of the first reactor vessel (1) by a circularly ring-shaped enlargement (15) directed radially outwards, and that a gas distribution bottom (16) for feeding the secondary reducing gas is provided in this enlargement (15).

11. Apparatus according to claim 3, characterized in that the gas feed duct (4) to the first reactor vessel and the secondary-reducing-gas feed means (17) to the further reactor vessel (11) are provided with volume controlling valves (23).

12. Apparatus according to claim 3, characterized in that the further reactor vessel (11), in its upper region, is provided with a radially outwardly cantilevering expansion (18) increasing the cross sectional area and forming a gas calm-down space.

13. Apparatus according to claim 3, characterized in that the gas discharge means (9) departs from the first reactor vessel 1 by at least one vertically oriented region.

* * * * *